July 30, 1968
C. T. ALTFATHER
3,395,332
VOLTAGE DROPPING CIRCUIT
Filed Oct. 14, 1964
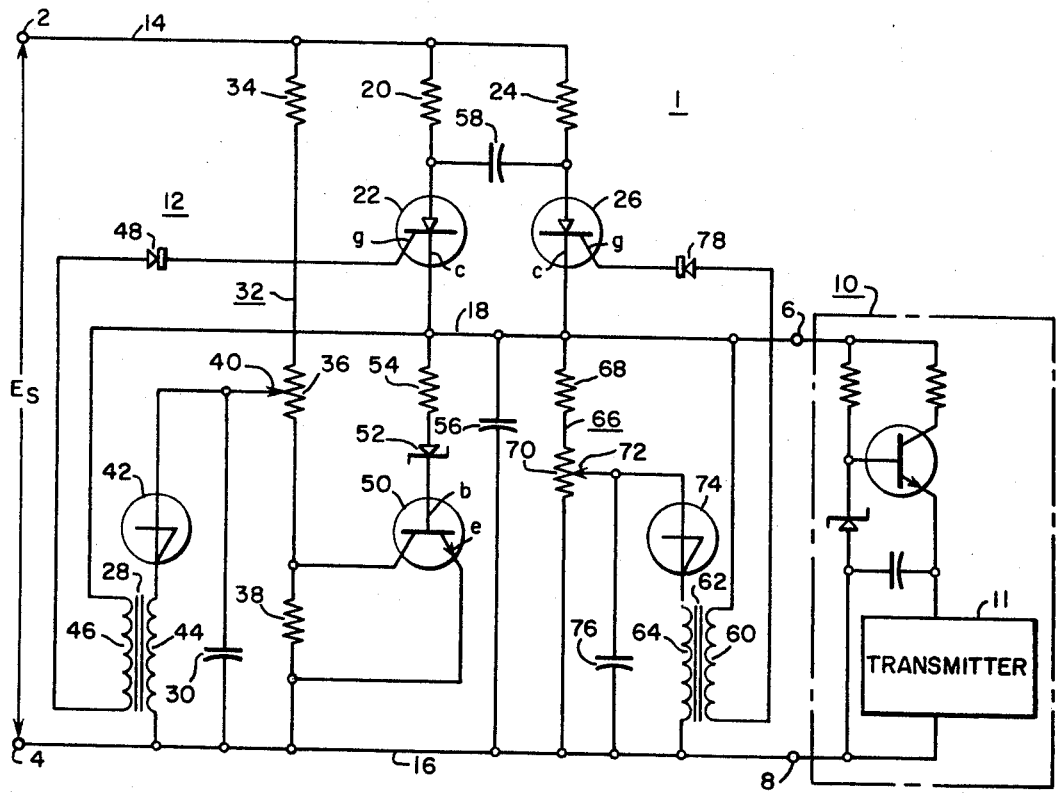
INVENTOR
Conrad T. Altfather
BY
John L. Houghton
ATTORNEY

United States Patent Office 3,395,332
Patented July 30, 1968

3,395,332
VOLTAGE DROPPING CIRCUIT
Conrad T. Altfather, Basking Ridge, N.J., assignor to Westinghouse Electric Corporation, East Pittsburgh, Pa., a corporation of Pennsylvania
Filed Oct. 14, 1964, Ser. No. 403,813
11 Claims. (Cl. 323—17)

ABSTRACT OF THE DISCLOSURE

This disclosure is directed to a voltage reducing network for connecting a stand-by apparatus requiring a minimum stand-by power to a source of direct current having a voltage level which is higher than the voltage level which may be applied to the apparatus and which network will provide sufficient power to the apparatus to enable it to operate in its actuated condition at an elevated power level. The voltage reducing network includes an impedance element having an impedance magnitude sufficient to provide a voltage drop equal to the difference in magnitudes of the maximum value of the source voltage level and the maximum value of load voltage level when minimum or stand-by power is being absorbed by the load. The voltage reducing network includes a second impedance element having an impedance magnitude of a lesser magnitude to provide a voltage drop equal to the difference in magnitude of the minimum value of the source voltage level and the minimum value of the load voltage level when maximum or operating power is being absorbed by the load. A voltage sensing device causes the load supplying busses to be connected to the source through one or the other of the impedances to maintain the load voltage within its voltage level.

---

This invention relates generally to voltage regulators and more specifically to a series type voltage regulator.

An object of this invention is to provide a direct current voltage regulator which has low losses during stand-by operation.

Another object of this invention is to provide such a regulator which will energize a stand-by load of minimum magnitude with low losses and permit operation at a greater load magnitude also with low losses.

A still further object is to provide a low loss voltage regulator for supplying a load which normally requires minimum power but which at selected intervals requires a high power.

Other objects will be apparent from the specification, the appended claims and the drawings, the sole figure of which illustrates schematically an apparatus embodying the invention.

Referring to the drawings by characters of reference, the numeral 1 indicates generally a voltage regulator having input terminals 2 and 4 adapted to be energized from a source of direct potential electrical energy of a higher voltage than can be supplied to a load 10 connected to output terminals 6 and 8. The load 10 may assume any of a variety of embodiments in which the required load current or power varies from a minimum value to a maximum value. A typical example would be a relaying transmitter-receiver 11 used in protecting electrical distribution networks having its voltage maintained at a desired value by a Zener controlled series transistor regulator of conventional construction.

The voltage regulating portion 12 comprises first and second busses 14 and 16 which are connected to the input terminals 2 and 4 and busses 18 and 16 which are connected to the output terminals 6 and 8. Power current for energizing the load flows from the bus 14 to the bus 18 through one or the other of two resistors 20 and 24 under control of a pair of valves which are shown as silicon controlled rectifiers 22 and 26. The magnitude of the resistance of the resistor 20 is selected so that when the input voltage between the busses 14 and 16 is at its minimum value and the load current is at its maximum value, the resistor 20 will drop the voltage at the bus 18 only to the minimum desired output voltage. The value of the resistance of the resistor 24 is so selected that when the voltage between the busses 14 and 16 is at a maximum value and the load current is at its minimum value, the resistor 24 will drop the voltage at the bus 18 to the maximum desired voltage. At all intermediate values of load current and input voltages, the controlled rectifiers 22 and 26 will alternate in conduction at a frequency which will maintain the desired voltage between the busses 16 and 18, and consequently the output terminals 6 and 8, within the desired output range of values.

Initial energization of the busses 14 and 16 causes the silicon controlled rectifier 22 to conduct first. It is rendered conducting by a pulse applied between its gate g and cathode c through a transformer 28 energized from a capacitor 30 charged by the voltage appearing across a first resistor network 32. More specifically, the resistor network 32 comprises a plurality of series connected resistors 34, 36, and 38 connected between the busses 14 and 16. The capacitor 30 is connected between a movable tap 40 of the resistor 36 and the bus 16 in shunt with resistor 38. The capacitor 30 is connected to discharge through primary winding 44 of the transformer 28 under control of voltage breakover type of diode 42. The diode 42 is preferably of the type which breaks over at a critical voltage and thereupon conducts with a voltage drop thereacross which is substantially less than the critical breakover voltage. The discharge of the capacitor 30 through the diode 42 pulsatingly energizes the transformer 28. The secondary winding 46 applies a gate pulse to the silicon controlled rectifier 22 through a diode or one way device 48 to pulse the valve 22 conductive.

In order that the firing network for the silicon controlled rectifier 22 may be rendered ineffective during certain operating portions of the regulator, as will be described below, the resistor 38 is shunted by the collector-emitter circuit of a transistor 50 which when rendered conducting will prevent the capacitor 30 from being charged to a sufficiently high voltage to cause breakover of the device 42. For this purpose the base b of the transistor 50 is connected through a Zener type breakover diode 52 and a resistor 54 to the bus 18 and the emitter e is connected to bus 16. When the voltage difference between the busses 16 and 18 exceeds the minimum desired output potential of the regulator 12, the Zener diode 52 breaks over to permit base current to flow in the transistor 50 thereby rendering the collector-emitter circuit conductive. Since the controlled rectifier 22 is conducting at this time and since it is of the thyratronic or discontinuous control type, the controlled rectifier 22 will continue to conduct and the bus 18 will be energized through the resistor 20.

If the magnitude of the power required by the load 10 is less than its maximum value, the voltage drop across the resistor 20 will be too small to maintain the potential difference between the busses 16 and 18 at the minimum desired value and the potential difference therebetween will increase at a rate determined by a storage capacitor 56. If the current required by the load 10 decreases to a critical value (which critical value will be different for different values of input potential to the busses 14 and 16) the potential between the busses 16 and 18 will reach the maximum desired output potential. When this occurs, the controlled rectifier 26 is rendered conducting whereby the bus 18 is energized through resistor 24. Conducting of the rectifier 26 acts through the commutating capacitor 58 to extinguish the controlled rectifier 22 and vice versa so that the bus 18 is energized through solely one of the resistors 20 or 24 at any one time.

The firing circuit for the controlled rectifier 26 is energized from the potential established by a resistor network 66 in much the same manner as described for the rectifier 22. Specifically, the secondary winding 60 of a firing transformer 62 is connected between the gate g and the cathode c of the rectifier 26. The primary winding 64 of transformer 62 is connected across a capacitor 76 through a voltage breakover type of diode 74, which preferably is like the diode 42. The capacitor 76 is charged by a potential derived from a resistor network 66 which comprises first and second resistors 68 and 70 series connected between the busses 18 and 16. The capacitor 76 is connected between an adjustable tap 72 of resistor 70 and the bus 16. The position of the tap 72 is selected such that the potential to which the capacitor 76 may be charged when the bus 18 is at the maximum desired potential will cause breakover of the diode 74. As stated above in connection with the firing of valve 22, the breakover of diode 74 causes the capacitor 76 to discharge through winding 64 and pulse the valve 26 into conduction. Since the magnitude of resistance 24 is sufficient to prevent the rise in potential of the bus 18 above the maximum output potential of the regulator 12 at all values of output current and input voltage, the potential of bus 18 will decrease below this maximum potential and the potential of the capacitor 76 will thereafter not reach the breakover voltage of the diode 74 and pulsing of the transformer 62 will terminate. The rectifier 26 will, however, continue to conduct since it is of the thyratronic type.

The operation of the voltage regulator 1 is as follows: For purposes of explanation, it will be assumed that the operating range of input voltage is from 210 to 280 volts, the operating range of the output voltage is from 105 to 140 volts, and the operating range of the load current is .2 ampere at stand-by and 1.1 ampere when transmitting. Upon initial energization of the input terminals 2 and 4, the voltage between the busses 14 and 16 immediately rises to a value between 210 and 280 volts. This causes the capacitor 30 to charge up to the breakover voltage of the device or diode 42 causing diode 42 to break over and via the transformer 28 pulse the rectifier or valve 22 into conduction. This conpletes a charging connection from bus 14 to bus 18 and the potential of the bus 18 increases with respect to that of the bus 16 at a rate determined, at least in part, by the magnitudes of the capacitance of the capacitor 56 and the current drawn by the load 10. When this potential reaches the minimum rated output voltage of the 105 volts, the diode 52 breaks over and base drive current causes the transistor 50 to conduct. Conduction of the transistor 50 lowers the potential of the tap 40 to prevent further pulsing of the transformer 28.

If it is assumed that the minimum input volts of 210 is being applied and the load is operating at its maximum output current of 1.1 ampere, the voltage between the busses 16 and 18 will approach but not exceed the 140 volt output of the voltage regulator 1. Upon a decrease in load current or an increase in supply voltage, the voltage drop across the resistor 20 will be insufficient to maintain the potential of the bus 18 with respect to bus 16 below the 140 volt desired maximum output voltage of the regulator. When this potential difference exceeds the maximum voltage, the potential across the capacitor 76 rises to the breakover voltage of the diode 74, the diode 74 conducts and the capacitor 76 discharges through the transformer 62 to render valve 26 conducting and valve 22 blocked.

Current now flows through the higher value resistance of the resistor 24 and the voltage between the busses 16 and 18 will decrease. If the load current is sufficiently large or the input voltage to the terminals 2 and 4 sufficiently small, this potential drop across the resistor 24 will be sufficiently great so that the potential between the busses 16 and 18 will drop to 105 volts. When this occurs, the diode 52 ceases to conduct, to terminate conduction of the transistor 50 and capacitor 30 charges. When this charge reaches the breakover potential of the diode 42, it conducts and discharges capacitor 30 through transformer 28 to refire the controlled rectifier or valve 22. This causes the rectifier 26 to become nonconductive and the energy to flow through the lower magnitude resistance of resistor 20.

Assuming that the load current is of a sufficiently great magnitude and/or the input voltages to terminals 2 and 4 is sufficiently small so that the potential drop across the resistor 20 is less than the difference between the desired maximum operating voltage of the bus 18 and the input voltage to the bus 14, the potential of the bus 18 will eventually reach the desired maximum potential 140 volt magnitude of the output bus 18, the valve 26 will again conduct, the valve 22 will again block and energy will flow through the higher magnitude resistance of resistor 24. This cycle will continue to occur until, or unless, an equilibrium condition is reached in which the potential drop across one of the resistors 20 or 24 at the current flow therethrough and at the potential supplied to the terminals 2 and 4 will hold the potential of the bus 18 between its minimum and maximum output values.

A particular feature of this regulator is the choosing of the magnitudes of the resistance of the resistors 20 and 24 such that at standby operation of the load 10 the higher value of resistance of resistor 24 is utilized and at the higher load current when the device 10 is transmitting the lower value of the resistance of resistor 20 is utilized for at least a substantial part of the time. This results in a lesser power loss than the use of the lower value of resistance during standby which lower value is required for the increased load power.

Although the invention has been described with reference to a single embodiment, numerous modifications are possible and it is desired to cover all modifications falling within the spirit and scope of the invention.

What is claimed and desired to be secured by United States Letters Patent is as follows:

1. An apparatus for supplying a desired magnitude of output voltage to a load which operates between a predetermined minimum power value and a predetermined maximum power value from a source of voltage which is of established magnitude, which established magnitude is greater than the magnitude of the desired output voltage, a pair of output terminals operable to be connected to a load, a pair of input terminals operable to be connected to a source, first and second impedance devices, first and second switching devices, a first current path interconnecting said pairs of terminals and including said first impedance device, the impedance of said first impedance device being of such magnitude that the potential drop thereacross is not less than the difference in the established magnitude of the source voltage and the desired magnitude of the output voltage when the power flowing to said output terminals is at said predetermined minimum power value, a second current path interconnecting said pairs of terminals and including said second impedance device, the impedance of said second impedance device being of such magnitude that the potential drop thereacross is not greater than the difference in the established magnitude of the source voltage and the desired magnitude of the output voltage when the power flowing to said output terminals is at said predetermined maximum power value, the magnitude of said first recited potential drop being greater than the magnitude of said second recited potential drop, and means sensitive to the voltage at said output terminals to render said paths conducting, said means being responsive to the existence of a predetermined low limit of said desired magnitude of said output voltage at said output terminals to render said first path conductive and being responsive to the existence of a predetermined high limit of said desired magnitude of said output voltage at said output terminals to render said second path conductive.

2. In combination, a source of unidirectional potential electrical energy operable to supply potential of a magnitude which is maintained between a predetermined minimum and a predetermined maximum value, a load absorbing power between a minimum level and a maximum level and requiring an energizing potential which falls between a minimum and a maximum potential magnitude, first and second current responsive potential dropping devices, first and second switching devices, a first current path connecting said source to said load and including said first device in series connection, a second current path connecting said source to said load and including said second device in series connection, the magnitude of said first dropping device being such that the magnitude of the potential dropped thereby when said load is absorbing power at said minimum level is substantially equal to the difference between the magnitude of said predetermined maximum value of said supply potential and the magnitude of said predetermined maximum load potential, the magnitude of said second dropping device being such that the magnitude of the potential dropped thereby when said load is absorbing power at said maximum level is substantially equal to the difference between the magnitude of said predetermined minimum value of said supply potential and the magnitude of said predetermined minimum load potential, and switch means rendering solely one of said current paths conducting whereby to maintain the output potential within said minimum and maximum potential magnitudes.

3. The combination of claim 2 in which there is provided an energy storage device connected to said second path for receiving energy therefrom and connected to said load to supply energy thereto.

4. The combination of claim 2 in which said storage device is connected to both of said paths and comprises a capacitor.

5. In combination, a pair of input terminals adapted to be energized from a source of unidirectional potential energy, a pair of output terminals adapted to be connected to a load, first and second potential dropping impedance devices, first and second switch devices, each said switch device having an open and a closed condition, a first current path connecting said pairs of terminals and including said first devices in series connection, a second current path connecting said pairs of terminals and including said second devices in series connection, a control network controlling the conductive condition of said paths and including first and second switch actuators, means connecting said first actuator to said output terminals, said first actuator being effective to actuate said first switch device to its said closed condition as a consequence of the potential at said output terminals reaching a maximum potential, and means connecting said second actuator to said output terminals, said second actuator being effective to actuate said second switch device to its said closed condition as a consequence of the potential at said output terminals reaching a minimum potential, said control network including means preventing the concurrent conduction of said paths.

6. The combination of claim 5 in which there is provided means actuable as a consequence of the attainment of said maximum potential at said output terminals to actuate said second switch to its said open condition, and energy storage means connected across said output terminals.

7. In a voltage regulating device, a pair of input terminals adapted to be connected to a source of unidirectional potential supply, a pair of output terminals adapted to be connected to a load, first and second resistors, first and second thyratronic type control valves, each said valve having a main circuit and a control circuit, first and second breakover type diodes, a capacitor, a first current path connecting said pairs of terminals and including said first valve and said first resistor in series circuit, a second current path connecting said pairs of terminals and including said second valve and said second resistor, in series circuit the magnitude of the resistance of said second resistor being greater than the magnitude of the resistance of said first resistor, first control circuit connected between said output terminals and said control circuit of said second valve and including said first breakover diode, said first breakover diode being effective at a maximum voltage at said output terminals to break over whereby said first control circuit is rendered effective to render said main circuit of said first valve conductive, second control circuit connected between said output terminals and said control circuit of said first valve and including said second breakover diode, said second diode being effective at a minimum voltage at said output terminals to terminate its conduction and thereby render said second control circuit effective to render said main circuit of said first valve conductive, and means responsive to the initiation of conduction of said main path of said first valve conducting to render said main path of said second valve non-conducting and vice versa.

8. The combination of claim 7 in which there is provided a third breakover type diode, a third control circuit connected to said input terminals and to said control circuit of said first valve, and including said third diode, said third diode being operable to breakover at a predetermined minimum voltage at said input terminals and render said main circuit of said first valve conducting, a said second diode being effective to break over at a predetermined minimum voltage at said output terminals to render said third circuit ineffective, said minimum voltage of said output terminals being less than said maximum output voltage of said output terminals and said maximum output voltage of said output terminals being less than said minimum voltage at said input terminals.

9. In combination, first and second and third busses, a plurality of resistors, first and second thyratronic type valves, each said valve having a main circuit and a control circuit for controlling the initiation of conduction through its associated said main circuit, a plurality of capacitors, first and second transformers, each said transformer having a primary winding portion and a secondary winding portion, first and second breakover type diodes, a Zener diode, a resistive network connected between said first and said third busses and including at least one of said resistors, means connecting said secondary winding portion of said first transformer to said control circuit of said first valve, circuit means connecting a portion of said resistive network to said primary winding portion of said first transformer and including said first breakover diode, means connecting a first of said capacitors in shunt with said primary winding portion of said first transformer and said first breakover diode, a third valve having a main circuit and a control circuit, means connecting said main circuit of said third valve in shunt with said first capacitor, means connecting said control circuit of said third valve between said second and said third busses and including said Zener diode, means connecting said secondary winding portion of said second transformer to said control circuit of said second valve, a second resistive network connected between said second and said third busses and including at least a first of said resistors, circuit means connecting a portion of said second resistive network to said primary winding portion of said second transformer and including said second break over diode, means connecting a second of said capacitors in shunt with said primary winding portion of said second transformer and said second diode, means connecting a third of said capacitors between said second and said third busses, first power conducting means connecting said first bus to said second bus and including in series circuit a second of said resistors and said main circuit of said first valve, second power conducting means connecting said first bus to said second bus and including in series circuit a third of said resistors and said main circuit of said second valve, and means interconnecting said thyratronic valves and effective as a consequence of the initiation of conduction of the main circuit of said first valve to extinguish conduction of the power circuit of second valve and vice versa.

10. In combination, a load operable at a minimum power requirement and at a maximum power requirement and requiring energization with a load voltage maintained between a first voltage range, a source of electrical energy having a source voltage range which is substantially higher than said load voltage range, each said range having minimum and maximum voltage limits, a network connecting said load to said source and including impedance means through which the current flows as power is supplied from said source to said load, said network having a first operating condition in which said impedance means exhibits an impedance of a first magnitude and a second operating condition in which said impedance exhibits an impedance of a second magnitude, said first magnitude of impedance being such that the magnitude of the voltage drop across said network is not less than the magnitude of the voltage difference between the magnitudes of the maximum limit of said source voltage and the maximum limit of said load voltage when said load is operating at said minimum power requirement, said second magnitude of impedance being such that the magnitude of the voltage drop across said network is not greater than the magnitude of the voltage difference between the magnitudes of the maximum limit of said source voltage and the maximum limit of said voltage when said load is operating at said maximum power requirement, and first contact means selecting the operation of said network to provide operation at solely said first or said second magnitudes of impedance.

11. The combination of claim 10 in which there is provided a second control means energized by the load voltage to control said first control means, said second control means actuating said first means to provide operation at said first magnitude of impedance when the load voltage is substantially at said maximum limit of said first range and to provide operation at said second magnitude when the load voltage is substantially at said minimum limit of said first range.

References Cited
UNITED STATES PATENTS

| | | | |
|---|---|---|---|
| 3,264,551 | 8/1966 | Segawa | 323—74 |
| 3,299,347 | 1/1967 | Torii | 323—97 |
| 3,262,015 | 7/1966 | McNamee et al. | 317—20 |
| 3,213,351 | 10/1965 | Walker | 321—18 |
| 2,548,491 | 4/1951 | Peek | 317—16 |
| 2,403,637 | 7/1946 | Christie | 317—20 |
| 2,350,195 | 5/1944 | Rypinski | 317—20 |
| 1,806,317 | 5/1931 | Thompson | 317—20 |

LEE T. HIX, *Primary Examiner.*

G. GOLDBERG, *Assistant Examiner.*